UNITED STATES PATENT OFFICE 1,987,162

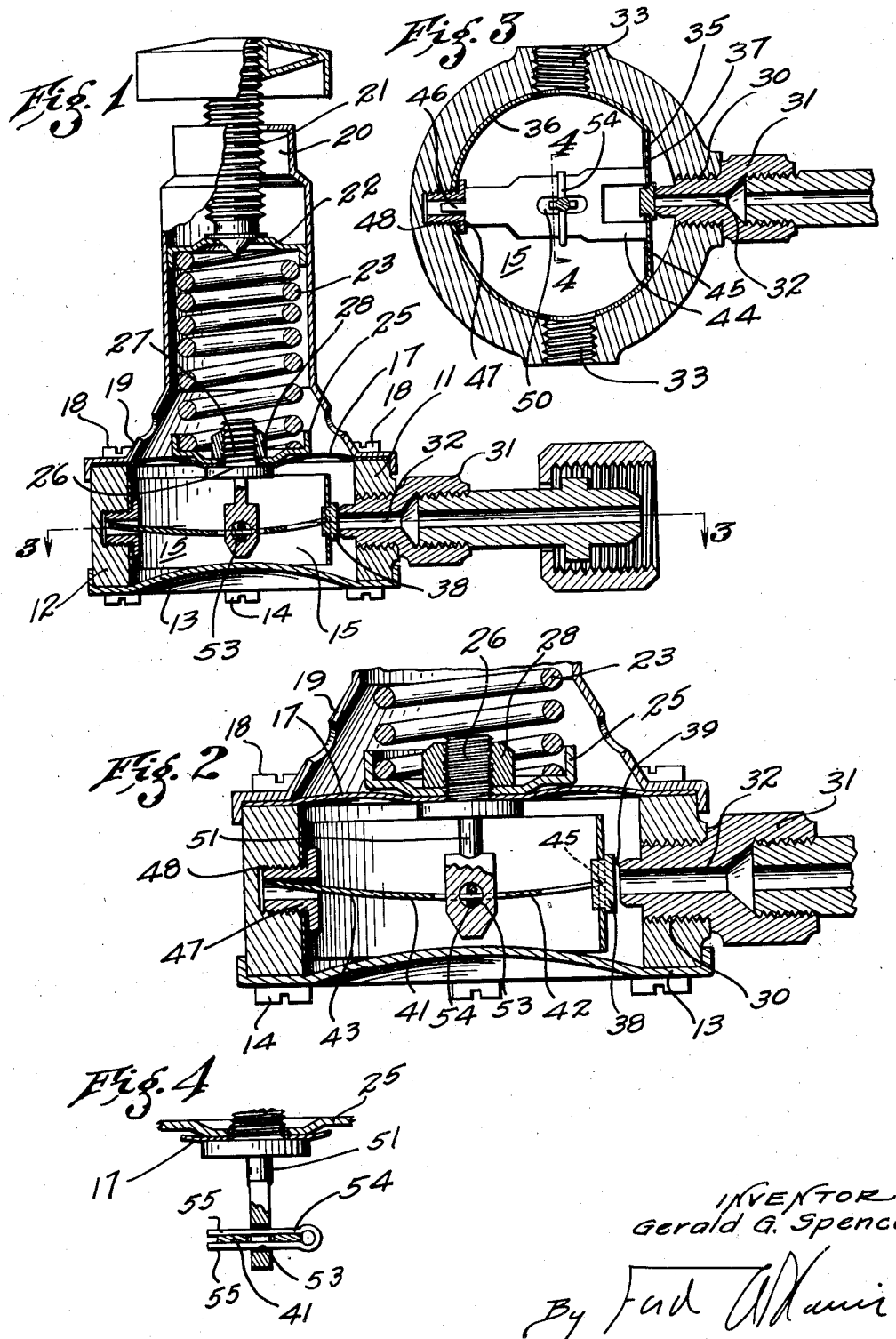

FRICTIONLESS PRESSURE REGULATOR

Gerald G. Spencer, Denver, Colo., assignor, by mesne assignments, to Union Carbide and Carbon Research Laboratories, Inc., a corporation of New York Application July 5, 1928, Serial No. 290,533

21 Claims. (Cl. 50—26)

My invention relates to pressure regulators of the character employed in the oxyacetylene welding art for reducing the gas from drum-pressure to torch-pressure.

It is an object of this invention to provide a pressure regulator in which the frictional drag is very small. The advantage of this feature is that the regulator, when set to deliver a certain pressure, will not deliver a fluctuating pressure. In order that this advantage may be fully appreciated, I will explain the action which occurs if there is any appreciable friction in the regulator. The action which takes place is best illustrated by connecting a torch to the regulators supplying oxygen and acetylene to it, neutralizing the flame by adjusting the regulators and then pinching one hose in order to close it, and allowing it to open again. Invariably the flame will not return to its true neutral condition. The reason for this is that there is a friction or drag in the regulator mechanism. It can be readily seen that regulator mechanism so constructed that it is practically frictionless is a great advantage over present regulators, in view of the fact that it obviates the necessity of continually adjusting the torch flame by operating the needle valves of the torch.

To accomplish the object just mentioned, I reduce the number of operating parts, and further than this, I design the valve controlling mechanism so that the force of the diaphragm is multiplied when applied to the valve, and so that the movement applied to the valve is decreased considerably below that of the movement of the diaphragm. This design endows the regulator with a sensitiveness which avoids fluctuation of the pressure delivered by the pressure regulator.

Another object of my invention is to provide a practically frictionless supporting means for the valve of the regulator, which supporting means holds the valve a small distance from its nozzle in such a manner that there is practically no opposition to the further opening or closing of the valve. I have found that the friction of the supporting means of the valve has considerable to do with the sensitiveness of the regulator and the constantness of the pressure delivered by the regulator. My improvement of the supporting means of the valve is a prominent consideration of this invention.

In the preferred form of my invention I accomplish the object which I have just mentioned by providing a flexible or resilient supporting means for carrying the valve. The supporting means consists of a flat spring-member designed for flexure toward and away from the nozzle of the regulator.

The design of my invention embodies various other objects and advantages, and these will be made manifest in the following description.

Referring to the accompanying drawing, in which the invention is illustrated,

Fig. 1 is a vertical sectional view showing the valve closed.

Fig. 2 is a fragmentary vertical sectional view similar to Fig. 1, showing the valve opened.

Fig. 3 is a section taken on the line 3—3 of Fig. 1.

Fig. 4 is a section taken on the line 4—4 of Fig. 3.

The form of the invention illustrated consists of a body 11, the body 11 comprising a ring 12 and a cap 13 secured to the ring 12 by means of screws 14. The body 11 provides a chamber 15. One side of the chamber 15 is closed by a diaphragm 17 which is attached to the ring 12 by screws 18, which screws 18 also connect a bonnet 19 to the ring 12. The bonnet 19 carries a bonnet-nut 20, through which an adjustment screw 21 is threaded. The adjustment screw 21 centers into a cup 22 which receives a spring 23. The opposite end of the spring 23 engages a cap 25, which is attached to the diaphragm 17 by means of a clamp-member 26 having a stem 27, on which a nut 28 is secured. The adjustment screw and spring parts associated therewith constitute the pressure exerting means of the invention which exerts a pressure on the diaphragm 17.

The ring 12 is provided with a threaded opening 30, into which an inlet-nipple 31 is threadedly secured. The inlet-nipple 31 provides an inlet 32, by means of which gas under pressure is conveyed to the chamber 15. The gas is conveyed from the chamber 15 by means of either of the outlets 33, the other receiving a pressure gauge.

Located in the chamber 15 is a valve-supporting means 35. The valve-supporting means has a partially cylindrical portion 36, which engages the inner wall of the ring 12 and has a chord portion 37, which extends in front of the inner end of the inlet 32. The supporting means 35 is formed from a flexible material, such as spring-steel or spring-bronze, and is adapted for flexure in a direction toward and away from the inner end of the inlet 32. The chord portion 37 of the supporting means 35 carries a closure member or valve 38. The valve 38 rests in a position adjacent to the inner end of the inlet 32, and is adapted for engaging a nozzle or valve seat 39, which surrounds the inner end of the inlet 32, The supporting means is so designed that normally the valve 38 is suported a very small distance from the nozzle 39, and is supported in such a manner that the valve 38 may move toward or away from the nozzle 39 with but a minimum of resistance or opposition.

For the purpose of controlling the position of the valve 38, I provide a mechanism which will now be described.

The numeral 41 represents a toggle consisting of a primary portion 42 and a secondary portion 43. The primary portion 42 has a forked end so as to provide legs 44. The legs 44 extend on opposite sides of the valve 38 and the ends thereof engage in recesses 45 provided in the chord 37 of the supporting means 35.

The end of the secondary portion 43 of the toggle 41 is reduced in width as indicated at 46, and extends into an adjuster 47. The adjuster 47 is threaded in a cavity 48 and by rotation may be advanced in or out in order to change the position of the toggle 41. The central portion of the toggle 41 is provided with an elongated slot 50 through which a stud 51 is extended. The stud 51 is shown in the drawing as being formed integrally with the clamp 26, which is secured to the diaphragm 17. The stud 51 has a transverse opening 53, and extending through this opening 53 is a key 54. The key 54 has legs 55 which extend on opposite sides of the central portion of the toggle 41. This provides a means for connecting the toggle and the stud. As shown in the drawing, the toggle 41 in its preferred form is in the form of a toggle-spring and it is operated by the stud 51, which causes it to bend or to straighten.

When the parts of the regulator are in the positions shown in Fig. 2, gas under pressure is passing through the inlet 32 and into the chamber 15. If the pressure in the chamber 15 increases above the desired pressure, the diaphragm 17 is forced upward against the action of the spring 23, and the following action occurs.

The toggle 41 is straightened from the position shown in Fig. 2 into the position shown in Fig. 1. In view of the fact that the left end of the secondary portion 43 cannot move outwardly, all of the movement takes place at the right of the primary portion 42. When the right end of the primary portion 42 moves outward, it flexes the chord 37 of the supporting member 35 toward the nozzle 39. The valve 38 being carried thereby, moves toward the nozzle 39 and restricts the flow of gas through the inlet 32. When the pressure in the chamber 15 decreases, the diaphragm 17 moves downward with the result that the toggle spring 41 is bent to a greater extent than is shown in Fig. 2. This permits the chord 37 of the supporting means 35 to move away from the nozzle 39, and moves the valve 38 therewith. This permits a greater flow of gas through the inlet 32 into the chamber 15, in order that the pressure therein may be increased.

It will be seen that the invention utilizes but few interconnecting parts between the valve nozzle 39 and the diaphragm 17. This simplicity of construction of course reduces the connections, and consequently reduces the frictional drag of the pressure regulator. The toggle means of the invention increases the force which closes the valve 38, and decreases the resultant movement of the diaphragm which is transmitted to the valve. This design increases the sensitiveness of the apparatus, and consequently reduces the possibility of fluctuation in the pressure delivered by the regulator.

The manner of supporting the valve 38, as I have previously pointed out, is a very important part of the invention. The chord 37 of the supporting means 35 is extremely flexible, and supports the valve 38 in such a manner that only a minimum of friction is offered to the movement of the valve 38 in either direction and, furthermore, it provides an invariable straight line path for the valve 38, thus insuring return of the valve 38 to the same position of closure every time.

While the arrangement preferred by the inventor for using this frictionless design is as illustrated herein, it is not his intention to limit the scope of this application to this arrangement alone.

I claim as my invention:

1. In a pressure regulator, the combination of: a body forming a chamber, and an inlet and outlet for said chamber; a diaphragm forming one wall of said chamber; pressure means for exerting a pressure against said diaphragm; a valve for closing said inlet, said valve seating on an axis substantially parallel with said diaphragm; flexible supporting means independent of said inlet for carrying said valve so that said valve may move towards and away from its seat only in the direction of the axis of said seat; and valve-control means associated with said valve and said diaphragm, said valve-control means increasing the force exerted by said diaphragm on said valve and decreasing the movement of said valve relative to said diaphragm.

2. In a pressure regulator, the combination of: a body forming a chamber, and an inlet and outlet for said chamber; a diaphragm forming one wall of said chamber; pressure means for exerting a pressure against said diaphragm; a valve for closing said inlet; flexible supporting means for supporting said valve so that said valve may move towards and away from its seat, said supporting means consisting of a flat spring supported by said body in position extending across the end of said inlet; and valve-control means engaging said supporting means and associated with said diaphragm.

3. In a pressure regulator, the combination of: a body forming a chamber, and an inlet and outlet for said chamber; a diaphragm forming one wall of said chamber; pressure means for exerting a pressure against said diaphragm; a valve for closing said inlet; supporting means consisting of a flexible loop for supporting said valve so that said valve may move towards and away from its seat; a toggle operative within said loop for controlling the position of said valve; and means for connecting said toggle and said diaphragm.

4. In a pressure regulator, the combination of: a body forming a chamber, and an inlet and outlet for said chamber; a diaphragm forming one wall of said chamber; pressure means for exerting a pressure against said diaphragm; a valve for closing said inlet; flexible supporting means for carrying said valve so that said valve may move towards and away from its seat; a toggle for controlling the position of said valve, said toggle consisting of an arcuate flat spring member; and means for connecting said toggle and said diaphragm.

5. In a pressure regulator, the combination of: a body forming a chamber, and an inlet and outlet for said chamber; a diaphragm forming one wall of said chamber; pressure means for exerting a pressure against said diaphragm; a valve for closing said inlet; flexible supporting means in the form of a flat spring for supporting said valve so that said valve may move towards and away from its seat in a straight line of movement; and valve-control means associated with said seat and said diaphragm.

6. In a pressure regulator, the combination of: a body forming a chamber, and an inlet and outlet for said chamber; a diaphragm forming one wall of said chamber; pressure means for exerting a pressure against said diaphragm; a valve for closing said inlet; flexible supporting means in the form of a flat spring supported at both its ends, for supporting said valve so that said valve may move towards and away from its seat; and valve-control means engaging said supporting means and associated with said diaphragm.

7. In a pressure regulator, the combination of: a body forming a chamber, and an inlet and outlet for said chamber; a diaphragm forming one wall of said chamber; pressure means for exerting a pressure against said diaphragm; a valve for closing said inlet; flexible supporting means in the form of a flat spring for supporting said valve so that said valve may move towards and away from its seat; a toggle for controlling the position of said valve; and means for connecting said toggle and said diaphragm.

8. In a pressure regulator, the combination of: a body forming a chamber, and an inlet and outlet for said chamber; a diaphragm forming one wall of said chamber; pressure means for exerting a pressure against said diaphragm; a valve for closing said inlet; flexible supporting means in the form of a flat spring for supporting said valve so that said valve may move towards and away from its seat; a toggle for controlling the position of said valve, said toggle engaging said supporting means; and means for connecting said toggle and said diaphragm.

9. A valve-supporting means for a pressure regulator comprising: a flexible member including a cylindrical portion by which said supporting means is supported, and a flat tangential flexible portion adapted to support a valve.

10. A valve-supporting means for a pressure regulator comprising: a loop having a partially cylindrical portion, and a flat flexible portion adapted to support a valve.

11. A valve supporting means for a pressure regulator consisting of a straight spring member adapted to hold a closure means intermediate its ends, and having means at its ends for securing it to a stationary portion of said regulator, said supporting means permitting the movement of said valve only in the direction of the axis of its seat.

12. A valve supporting device for a pressure regulator consisting of a loop of flexible material having one portion adapted for securement to the regulator and another portion adapted to hold a valve in operative position relative to the inlet opening of the regulator.

13. A valve supporting device for a pressure regulator consisting of a loop of flexible material having a cylindrical portion and a non-cylindrical portion, such non-cylindrical portion being adapted to hold a valve in operative position.

14. In a pressure regulator, the combination of: a body forming a chamber having an inlet and an outlet, and a wall inwardly and outwardly movable; means for exerting an inward pressure against said wall; a valve for closing said inlet; a flexible supporting means for supporting said valve so that said valve may move toward and away from said inlet, said supporting means consisting of a loop of flexible material having a parti-cylindrical portion and a flat flexible portion adapted to hold said valve in operative position; and valve-control means associated with said valve and said wall.

15. In a pressure regulator, the combination of: a body forming a chamber having an inlet and an outlet, and a wall inwardly and outwardly movable; means for exerting an inward pressure against said wall, a valve for closing said inlet; a flexible supporting means for supporting said valve so that said valve may move toward and away from said inlet, said supporting means consisting of a loop of flexible material adapted to engagement with said body at one side and to hold said valve in operative position at its other side; and valve-control means associated with said valve and said wall.

16. In a pressure regulator, the combination of: a body forming a chamber having an inlet and an outlet, a wall of said body being inwardly and outwardly movable; means for exerting a pressure tending to move said wall inwardly; a valve for closing said inlet; a valve support consisting of a flat spring member extending perpendicularly across the inner end of said inlet, said spring member having its end portions secured to said body on opposite sides of said inlet; and valve-control means for causing movement of said valve in response to movement of said wall.

17. In a pressure regulator, the combination of: a body forming a chamber having an inlet and an outlet, a wall of said body being inwardly and outwardly movable; means for exerting a pressure tending to move said wall inwardly; a valve for closing said inlet; valve supporting means consisting of a flexible loop having a portion thereof adapted to hold said valve and another portion thereof adapted for engagement with said body so that said valve will be supported by said loop in operative position relative to said inlet; and valve-control means for causing movement of said valve in response to movement of said wall.

18. In a pressure regulator, the combination of: a body forming a chamber having an inlet and an outlet, a wall of said body being inwardly and outwardly movable; means for exerting a pressure tending to move said wall inwardly; a valve for closing said inlet; valve supporting means consisting of a flexible loop having a portion thereof adapted to hold said valve and another portion thereof adapted for engagement with said body so that said valve will be supported by said loop in operative position relative to said inlet; a toggle situated within said loop, said toggle being operative to flex said loop and to cause said valve to move relative to said inlet; and operative means connecting said toggle with said wall whereby movement of said wall will actuate said toggle in a manner to control the position of said valve.

19. A valve supporting means for a pressure regulator consisting of a straight spring member adapted to carry a closure means intermediate its ends, and having means at its ends for securing it to a stationary portion of said regulator in a manner substantially non-movable through the plane in which it lies.

20. In a pressure regulator, the combination of: a body forming a chamber, and an inlet and outlet for said chamber; a diaphragm; a valve for closing said inlet, said valve seating on an axis substantially parallel with said diaphragm;

pressure means for actuating said diaphragm; flexible supporting means independent of said inlet for supporting said valve so that said valve may move towards and away from its seat only in the direction of the axis of said seat; and valve-control means associated with said valve and said diaphragm adapted to increase the force exerted by said diaphragm on said valve and to decrease the movement of said valve relative to said diaphragm.

21. In a pressure regulator, the combination of: a body forming a chamber having an inlet and an outlet, a wall of said body being inwardly and outwardly movable; pressure means for actuating said wall; a valve for closing said inlet, said valve seating on an axis substantially parallel with said wall; flexible supporting means independent of said inlet for supporting said valve so that said valve is adapted to move relative to its seat only in the direction parallel with the axis of said seat; and valve-control means associated with said valve and said movable wall adapted to increase the force exerted by said movable wall on said valve and to decrease the movement of said valve relative to said wall.

GERALD G. SPENCER.